UNITED STATES PATENT OFFICE.

FERDINAND H. KOGGE, OF WEST HOBOKEN, NEW JERSEY.

METHOD OF REFINISHING RUBBER BLANKETS.

SPECIFICATION forming part of Letters Patent No. 403,942, dated May 28, 1889.

Application filed October 23, 1888. Serial No. 288,963. (No specimens.)

*To all whom it may concern:*

Be it known that I, FERDINAND H. KOGGE, of West Hoboken, in the county of Hudson and State of New Jersey, have invented a new and Improved Method of Refinishing Rubber Blankets, of which the following is a full, clear, and exact description.

This invention relates to the refinishing of rubber blankets of any description; but the invention is designed especially for use in the refinishing of blankets used upon the impression-cylinders of lithographic presses, such blankets becoming rough and uneven after even a short use, the object of the invention being to fill up all cavities in the surface of the blanket with a tough but yielding material, and in a manner such that the refinished surface will be smooth and durable.

In carrying out my method I apply to the worn surface of the blanket a composition consisting of varnish, gutta-percha, and white-lead ground in oil, a coloring matter—such as lamp-black or graphite—being employed, if desired; and it is the application of this composition which constitutes the chief step in my method of refinishing blankets.

In detail the method is as follows: The worn surface of the blanket is first cleaned, and is then coated with a composition made up of one part of varnish, preferably lithographic varnish, one part of dissolved gutta-percha, and ten parts of white lead ground in oil, one part of either lampblack or graphite being added, if desired. After this composition has been applied the blanket is allowed to dry, and after drying is rubbed down smooth and polished.

In certain cases, after the operation just described, it will be found desirable to apply a second composition made up of one part of varnish, preferably Japan varnish, ten parts of white lead ground in oil, and one part of coloring-matter, a coat of shellac being applied after the second composition has dried and has been smoothed and polished. This second application, however, is only necessary in case the surface of the blanket is extremely irregular; and although the introduction of the coloring-matter—such as lamp-black or graphite—is desirable, still it is not essential.

Having thus described my invention, I claim as new and desire to secure by Letters Patent—

1. The herein-described method of refinishing rubber blankets, which consists in coating the worn surface of the blanket with a composition made up of varnish, gutta-percha, and white lead and oil, combined substantially in the proportions specified, in allowing the material so applied to dry, and in finally smoothing and polishing the surface, substantially as described.

2. The herein-described method of refinishing rubber blankets, which consists in first cleaning the surface of the blankets, in then applying a coat of a composition made up of varnish, gutta-percha, white lead, and oil, combined substantially in the proportions specified, in smoothing and polishing the coat after it has been allowed to dry, and in then applying a coat of a composition made up of white lead, Japan varnish, and oil, combined substantially in the proportions specified, in polishing the surface after it has dried, and in finally applying a coat of shellac varnish, substantially as described.

FERDINAND H. KOGGE.

Witnesses:
EDWARD KENT, Jr.,
C. SEDGWICK.